(12) United States Patent
Kim

(10) Patent No.: US 9,444,080 B2
(45) Date of Patent: Sep. 13, 2016

(54) BATTERY PACK

(75) Inventor: Taeyong Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 884 days.

(21) Appl. No.: 12/968,208

(22) Filed: Dec. 14, 2010

(65) Prior Publication Data

US 2011/0300433 A1 Dec. 8, 2011

(30) Foreign Application Priority Data

Jun. 7, 2010 (KR) .................. 10-2010-0053426

(51) Int. Cl.
*H01M 10/02* (2006.01)
*H01M 2/10* (2006.01)
*H01M 2/20* (2006.01)
*H01M 6/42* (2006.01)

(52) U.S. Cl.
CPC ............. *H01M 2/1022* (2013.01); *H01M 2/10* (2013.01); *H01M 2/1011* (2013.01); *H01M 2/1016* (2013.01); *H01M 2/202* (2013.01); *H01M 6/42* (2013.01)

(58) Field of Classification Search
None
See application file for complete search history.

(56) References Cited

U.S. PATENT DOCUMENTS

| | | | | |
|---|---|---|---|---|
| 4,347,294 A | * | 8/1982 | Mejia | H01M 2/0245 429/151 |
| 4,407,911 A | * | 10/1983 | Hooke | 429/94 |
| 6,152,776 A | * | 11/2000 | Ikeda et al. | 439/627 |
| 7,108,940 B2 | * | 9/2006 | Sharrow | H01M 2/202 429/149 |
| 7,367,847 B2 | * | 5/2008 | Gutman | H01M 2/206 429/158 |
| 2002/0006544 A1 | * | 1/2002 | Asaka et al. | 429/99 |
| 2003/0027039 A1 | * | 2/2003 | Benson | H01M 2/0212 429/158 |
| 2003/0146734 A1 | * | 8/2003 | Kozu et al. | 320/107 |
| 2003/0215702 A1 | | 11/2003 | Tanjou et al. | |
| 2005/0031945 A1 | * | 2/2005 | Morita et al. | 429/158 |
| 2005/0250006 A1 | | 11/2005 | Kim | |
| 2006/0026822 A1 | * | 2/2006 | Seman et al. | 29/623.4 |
| 2006/0166086 A1 | * | 7/2006 | Kato | 429/153 |
| 2006/0214630 A1 | | 9/2006 | Huang | |
| 2006/0246350 A1 | * | 11/2006 | Takayama et al. | 429/178 |

(Continued)

FOREIGN PATENT DOCUMENTS

EP 1 523 051 A2 4/2005
JP 2002-298805 10/2002

(Continued)

OTHER PUBLICATIONS

SIPO Office action dated Jul. 15, 2013, with English translation, corresponding to Chinese Patent application 201010610100.8, (15 pages).

(Continued)

Primary Examiner — Ula C Ruddock
Assistant Examiner — Amanda Barrow
(74) Attorney, Agent, or Firm — Lewis Roca Rothgerber Christie LLP

(57) ABSTRACT

A slim and compact battery pack is provided. The battery pack includes a battery module including a plurality of battery cells stacked in vertical and horizontal directions, and a plurality of bus bars electrically coupled to the plurality of battery cells; and a connector including an insulation body connected to the battery module, and power terminals formed in the insulation body and electrically coupled to a group of the plurality of bus bars.

16 Claims, 9 Drawing Sheets

(56) References Cited

U.S. PATENT DOCUMENTS

| | | | |
|---|---|---|---|
| 2007/0015050 A1* | 1/2007 | Jung et al. | 429/152 |
| 2007/0281208 A1* | 12/2007 | Yoon et al. | 429/176 |
| 2008/0057393 A1* | 3/2008 | Onuki et al. | 429/159 |
| 2008/0090139 A1* | 4/2008 | Hurst | H01M 2/1016 429/156 |
| 2008/0118819 A1* | 5/2008 | Gamboa et al. | 429/61 |
| 2008/0254356 A1* | 10/2008 | Liersch | H01M 2/105 429/160 |
| 2008/0284375 A1 | 11/2008 | Nagaoka et al. | |
| 2009/0017368 A1* | 1/2009 | Hayashi et al. | 429/100 |
| 2009/0111015 A1* | 4/2009 | Wood et al. | 429/164 |
| 2009/0297892 A1* | 12/2009 | Ijaz et al. | 429/7 |
| 2010/0116570 A1 | 5/2010 | Sugawara et al. | |
| 2010/0266887 A1* | 10/2010 | Sekino | H01M 2/1016 429/123 |
| 2011/0244282 A1 | 10/2011 | Seto et al. | |
| 2012/0141848 A1 | 6/2012 | Nagaoka et al. | |

FOREIGN PATENT DOCUMENTS

| | | | | |
|---|---|---|---|---|
| JP | 2008-289234 | A | | 11/2008 |
| JP | 2009-289431 | | | 12/2009 |
| JP | 2010-113999 | A | | 5/2010 |
| JP | 2010-114025 | | * | 5/2010 |
| JP | 2011-216400 | A | | 10/2011 |
| KR | 10-2008-0022485 | | | 3/2008 |
| WO | WO 2006/135162 | A1 | | 12/2006 |
| WO | WO 2009/041018 | | * | 4/2009 ............. H01M 2/30 |

OTHER PUBLICATIONS

KIPO OA dated Aug. 30, 2011 for Korean priority patent application 10-2010-0053426, 3 pages.

Japanese Office action dated Oct. 30, 2012 issued in Japanese Patent No. 2010-287639, 2 pages.

European Search Report dated Apr. 12, 2011, for corresponding European Patent application 10197227.1, noting listed references in this IDS.

Patent Abstracts of Japan, and English machine translation of Japanese Publication 2002-298805, listed above, 7 pages.

SIPO Office action dated Mar. 5, 2014, with English translation, corresponding to Chinese Patent application 201010610100.8, (14 pages).

Patent Abstracts of Japan, and English machine translation of Japanese Publication 2009-289431 dated Dec. 10, 2009, listed above, (8 pages).

Patent Abstracts of Japan, and English machine translation of Japanese Publication 2010-114025 dated May 20, 2010, listed above, (9 pages).

* cited by examiner

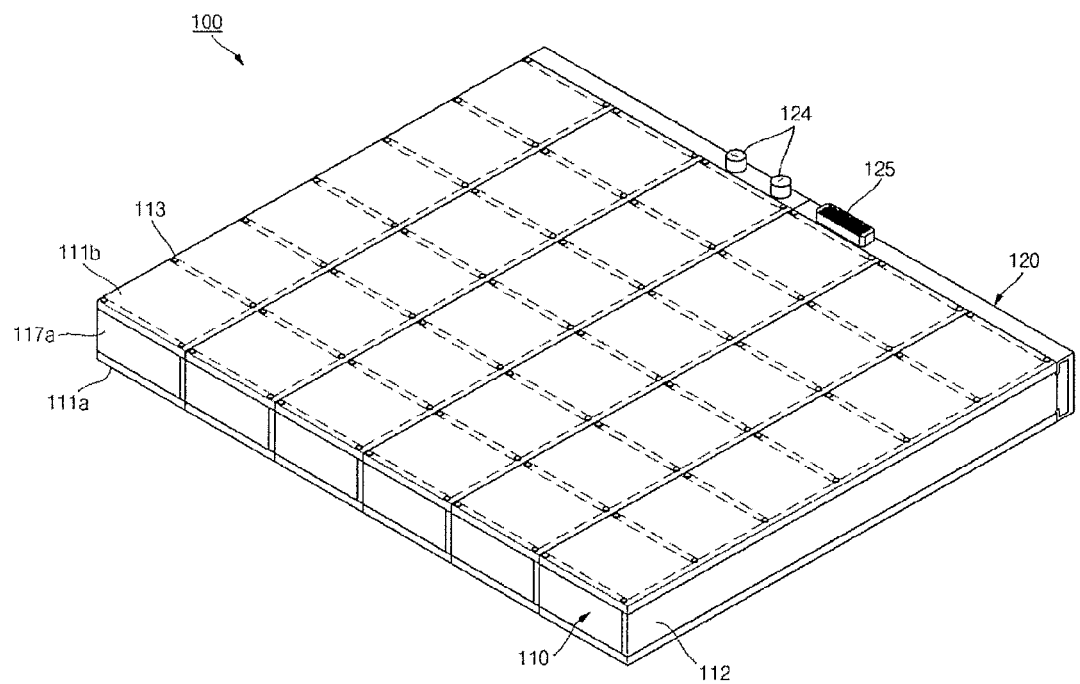

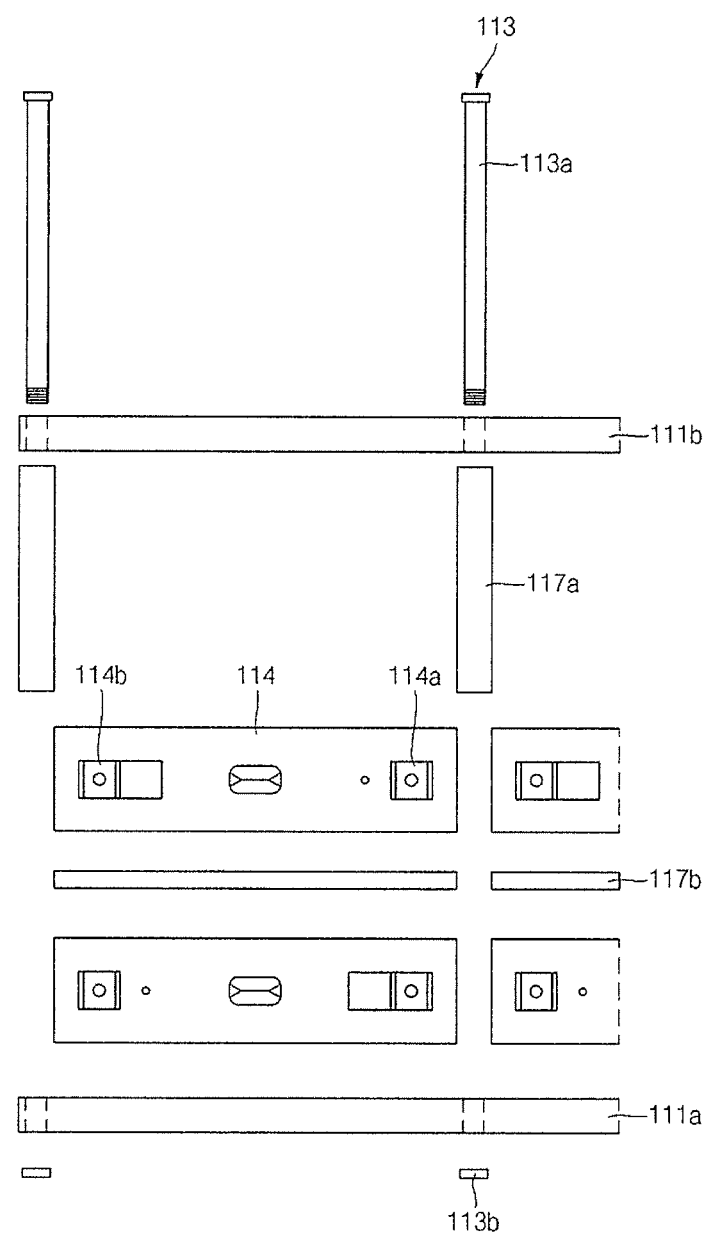

BATTERY PACK

CROSS-REFERENCE TO RELATED APPLICATION

This application claims priority to and the benefit of Korean Patent Application No. 10-2010-0053426, filed on Jun. 7, 2010, the entire content of which is incorporated herein by reference.

BACKGROUND

1. Field

An embodiment of the present invention relates to a battery pack.

2. Description of the Related Art

In general, a hybrid vehicle (which can move by reciprocal operations of an internal-combustion engine and an electric motor) or an electrical vehicle includes a battery pack as a power source. The battery pack includes a plurality of battery cells that are chargeable, and a housing accommodating the plurality of battery cells. Here, the plurality of battery cells are stacked in a horizontal direction and connected in series to each other.

The battery cells are positioned inside the housing in a state in which they stand upright. Further, the battery cells are horizontally arranged within the housing in multiple columns and rows. In this regard, the housing is relatively large-sized to accommodate all of the battery cells. In addition, in order to secure mechanical strength, a plurality of reinforcement members are attached to the housing, making it difficult to achieve a slim and compact battery pack.

In addition, since the battery cells are positioned inside the housing in a state in which they stand upright, wirings, including bus bars and sensing wires, electrically coupled to the battery cells, may become complicated.

The manufacturing process of a comparable battery pack, including placing a plurality of battery cells in a housing, connecting wires to the battery cells, connecting the wires to a circuit board, and assembling the housing, involves increased manufacturing process flow complexity, which may, therefore, detrimentally impact the manufacturing process efficiency.

SUMMARY OF THE INVENTION

An aspect of an embodiment of the present invention is directed toward a slim and compact battery pack.

Another aspect of an embodiment of the present invention is directed toward a battery pack having improved manufacturing efficiency.

An embodiment of the present invention provides a battery pack including: a battery module including a plurality of battery cells stacked in vertical and horizontal directions, and a plurality of bus bars electrically coupled to the plurality of battery cells; and a connector including an insulation body connected to the battery module, and power terminals formed in the insulation body and electrically coupled to a group of the plurality of bus bars.

In one embodiment, the battery module includes a plurality of battery modules at the connector and stacked in a vertical or horizontal direction and the plurality of battery modules are connected to each other.

In one embodiment, the battery module includes a protective cover covering the plurality of battery cells and the plurality of bus bars. In one embodiment, the group of the plurality of bus bars extend out of the protective cover and are electrically coupled to a corresponding one of the power terminals.

In one embodiment, sensing wires are connected to each of the plurality of bus bars, and the sensing wires are also connected to the connector. In one embodiment, the connector further includes a sensing terminal electrically coupled to the sensing wires. In one embodiment, the battery module further includes a protective cover covering the plurality of battery cells, the plurality of bus bars and the plurality of sensing wires. In one embodiment, some of the sensing wires extend out of the protective cover and are electrically coupled to a sensing terminal of the connector.

In one embodiment, barriers, which are electrically insulating and thermally conductive, are further disposed between the plurality of battery cells stacked in a vertical or horizontal direction.

In one embodiment, connecting trenches or connecting protrusions are further formed on a lateral portion of the battery module connected to the connector.

In one embodiment, connecting trenches or connecting protrusions are further formed on a lateral portion of the connector connected to the battery module.

In one embodiment, the battery module further includes: a lower cover contacting a bottom portion of the plurality of battery cells; an upper cover contacting a top portion of the plurality of battery cells; and a connection member connected to the battery module while passing through the lower cover and the upper cover. In one embodiment, the lower cover and the upper cover are made of steel or engineering plastic. In one embodiment, the connector further includes a plurality of power patterns formed on a surface of the insulation body and electrically coupled to the bus bars and a corresponding one of the power terminals. In one embodiment, the connector further includes a plurality of sensing patterns formed on a surface of the insulation body and electrically coupled to the sensing wires and a sensing terminal of the connector.

As described above, according to embodiments of the present invention, a plurality of battery modules having a plurality of battery cells stacked in vertical and horizontal directions are provided between a lower cover and an upper cover, and the plurality of battery modules are closely coupled to a connector in a vertical or horizontal direction, thereby providing a slim and compact battery pack.

In addition, since a battery pack is completed by sequentially coupling a plurality of battery modules to a connector in a vertical or horizontal direction, the manufacturing process efficiency is improved.

BRIEF DESCRIPTION OF THE DRAWINGS

The accompanying drawings, together with the specification, illustrate exemplary embodiments of the present invention, and, together with the description, serve to explain the principles of the present invention.

FIGS. 1A and 1B are a perspective view and a plan view of a battery pack according to an embodiment of the present invention;

FIG. 6 is a front view illustrating an assembling method of battery modules in a battery pack according to an embodiment of the present invention.

DETAILED DESCRIPTION

Figure 1B:
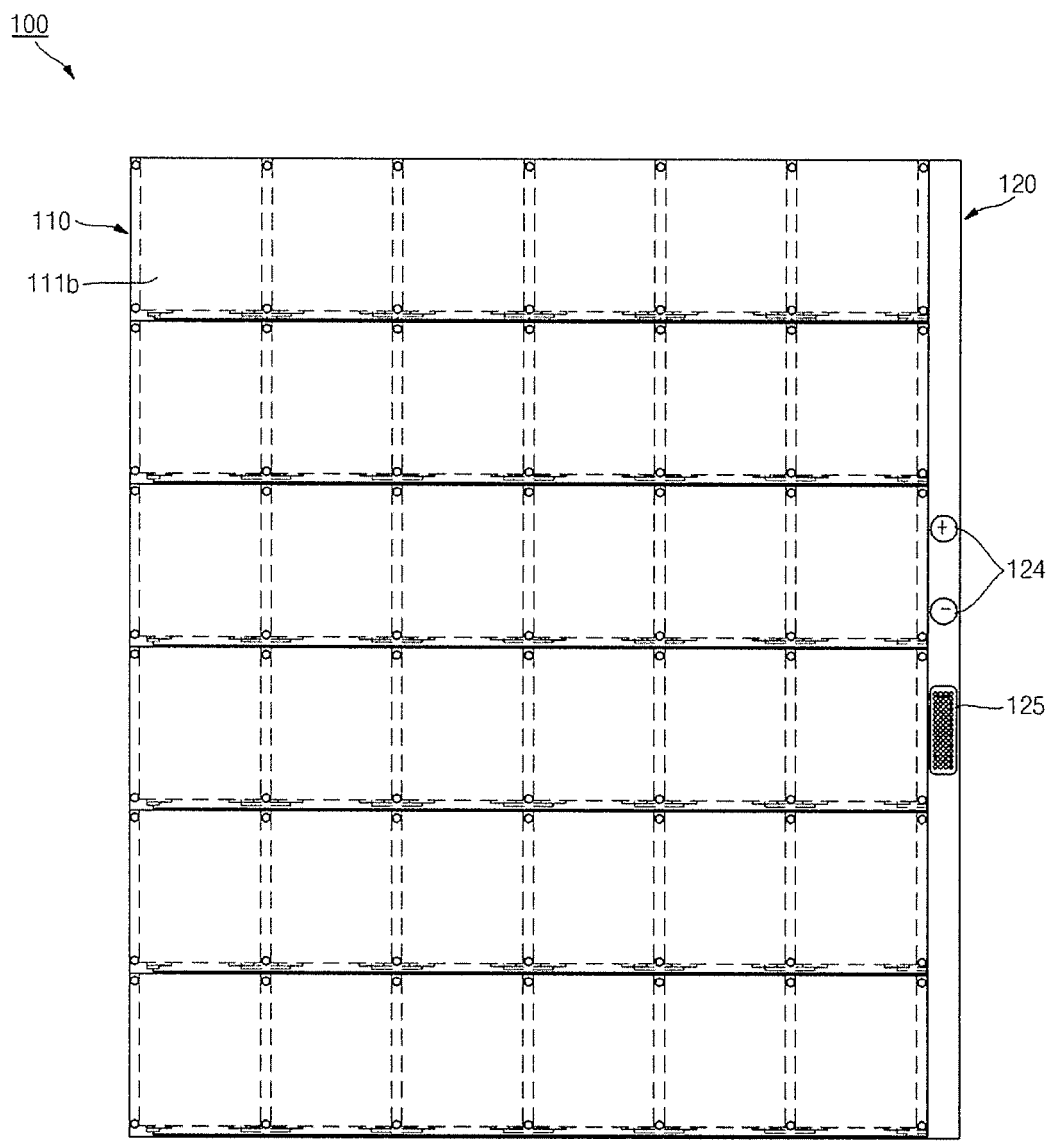

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

FIGS. 1A and 1B are a perspective view and a plan view of a battery pack according to an embodiment of the present invention.

As shown in FIGS. 1A and 1B, the battery pack 100 includes at least one battery module 110, and at least one connector 120 coupled to one side of the battery module 110.

The battery module 110 includes a lower cover 111a and an upper cover 111b. A plurality of battery cells 114 (see FIGS. 3 and 6) are stacked between the lower cover 111a and the upper cover 111b in vertical and horizontal directions. In addition, the plurality of battery cells 114 are connected to bus bars. In addition, a protective cover 112 is coupled to (e.g., coupled between) the lower cover 111a and the upper cover 111b and covers the bus bars. Further, as the connection member 113 is coupled to the lower cover 111a and the upper cover 111b, the lower cover 111a and the upper cover 111b restrain the plurality of battery cells 114.

The lower cover 111a and the upper cover 111b may be shaped to have a substantially rectangular plate shape. The lower cover 111a and the upper cover 111b may be made of, for example, steel, engineering plastic and/or equivalents thereof, but the present invention are not limited thereto. The steel may include an insulation layer formed thereon for preventing or protecting unwanted shorts from the battery cells. That is, the steel may include an insulation resin coated on its surface or a thick oxide film formed thereon. In addition, the engineering plastic may be reinforced plastic by being mixed with glass fiber and/or carbon fiber.

The protective cover 112 is formed between the lower cover 111a and the upper cover 111b and covers the plurality of battery cells 114 and the bus bars. The protective cover 112 may be made of an insulation resin. The protective cover 112 protects the bus bars from their external surroundings.

The connection member 113 may be formed of a bolt and a nut each having a set or predetermined length. As described above, the connection member 113 allows the lower cover 111a and the upper cover 111b to tightly contact the plurality of battery cells 114, thereby preventing or protecting the plurality of battery cells from moving away (deviating) to the outside. In FIGS. 1A and 1B, 117a represents a barrier, which will be described in more detail below.

Here, in one embodiment, the connector 120 is mechanically and electrically coupled to one side of the battery module 110. The connector 120 includes a power terminal (or power terminals) 124 and a sensing terminal 125. The power terminal 124 protrudes from the connector 120. A charger or an external load may be connected to the power terminal 124. In addition, the sensing terminal 125 protrudes from the connector 120. A control circuit that controls charging and discharging of the battery pack 100 may also be connected to the sensing terminal 125.

FIGS. 1A and 1B illustrate a state in which six battery modules 110 are connected to one connector 120, but embodiments of the present invention are not limited thereto. That is, according to embodiments of the present invention, less than six battery modules 110 or greater than six battery modules 110 may be connected to one connector 120. In addition, FIGS. 1A and 1B illustrate a state in which the battery pack 100 is in a reclined state, but embodiments of the present invention are not limited thereto. That is, according to embodiments of the present invention, the battery pack 100 according to embodiments of the present invention may be in an upright state.

As described above, the stacked plurality of battery modules 110 are provided between the lower cover 111a and the upper cover 111b, and the plurality of battery modules 110 are tightly coupled to the connector 120 in a vertical or horizontal direction, thereby attaining the slim and compact battery pack 100.

In addition, according to an embodiment of the present invention, the plurality of battery modules 110 are in turn coupled to the connector 120 in a vertical or horizontal direction, thereby completing the battery pack 100 and ultimately improving the manufacturing process efficiency.

Figure 2:
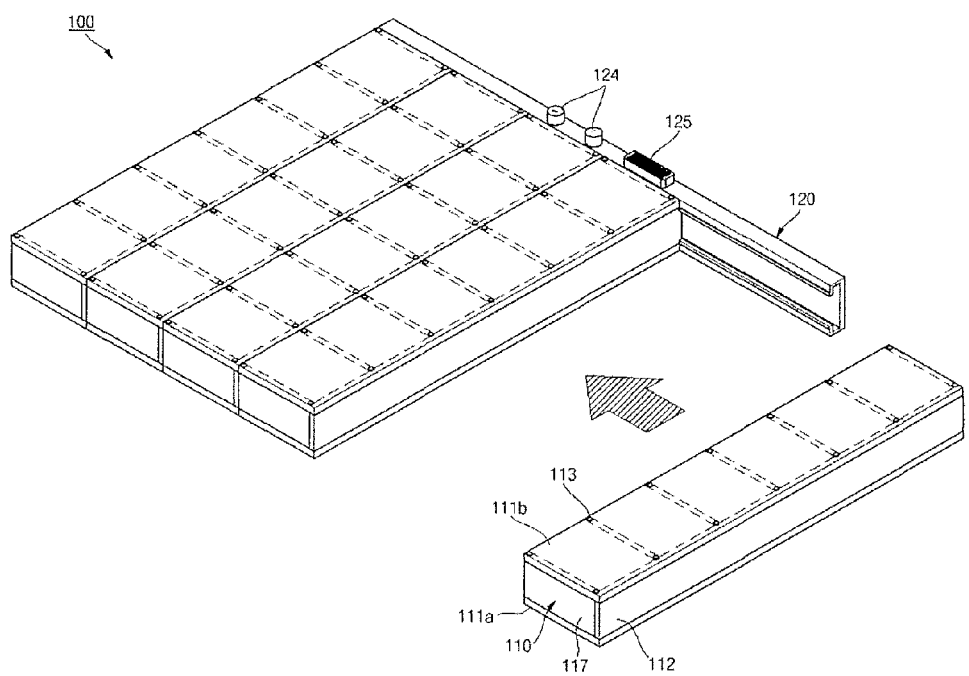
FIG. 2 is a perspective view illustrating a state in which battery modules are connected to a connector in the battery pack shown in FIGS. 1A and 1B.

FIG. 2 is a perspective view illustrating a state in which battery modules are connected to a connector in the battery pack shown in FIGS. 1A and 1B.

As shown in FIG. 2, the battery pack 100 according to an embodiment of the present invention includes a plurality of battery modules 110 mechanically and electrically coupled to the connector 120 in turn (e.g., in sequence). As described above, since the plurality of battery modules 110 are in turn connected to the connector 120, the plurality of battery modules 110 are stacked in a horizontal direction. Alternatively, in a case where the connector 120 is in an upright state, the plurality of battery modules 110 are stacked in a vertical direction. Therefore, the battery pack 100 according to the embodiment of the present invention may become slim and compact. In addition, since the battery modules 110 and the connector 120 are connected to each other in a simplified manner, the manufacturing process efficiency of the battery pack 100 is improved.

Figure 3:
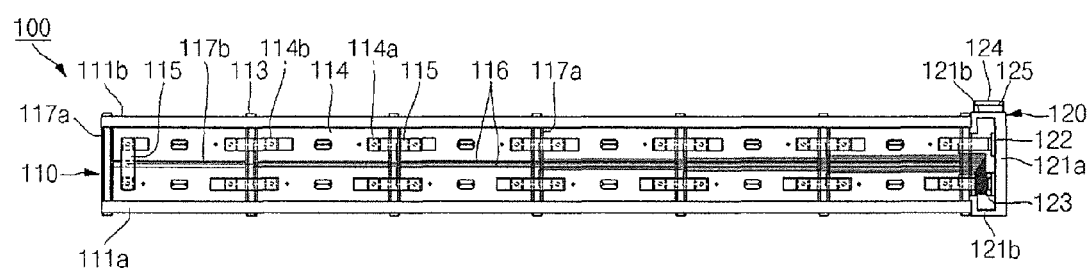
FIG. 3 is a front view illustrating a state in which battery modules are connected to a connector in the battery pack shown in FIGS. 1A and 1B.

FIG. 3 is a front view illustrating a state in which battery modules are connected to a connector in the battery pack shown in FIGS. 1A and 1B.

For a better understanding of the present invention, the protective cover is not illustrated in the drawing.

As shown in FIG. 3, the battery module 110 includes plurality of battery cells 114 stacked between the lower cover 111a and the upper cover 111b in vertical and horizontal directions. In one embodiment, two battery cells 114 may be stacked in a vertical direction and six battery cells 114 may be stacked in a horizontal direction, but embodiments of the present invention are not limited thereto.

The battery cells 114 may be any one type battery cells selected from lithium ion batteries, lithium polymer batteries, and equivalents thereof, but embodiments of the present invention are not limited thereto. Each of the battery cells 114 includes a positive electrode terminal 114a and a negative electrode terminal 114b. The positive electrode terminal 114a provided in one selected among the battery cells 114 is connected to the negative electrode terminal 114b provided in another adjacent battery cell selected among the battery cells 114 by bus bars 115. In one embodiment, the bus bars 115 may be mechanically and electrically coupled to the negative electrode terminal 114b adjacent to the positive electrode terminal 114a provided in one selected among the battery cells 114. In this way, for example, 12 battery cells 114 may be connected in series to each other.

In addition, the bus bars 115 positioned at a region adjacent to the connector 120 further extend to the outside of the battery module 110, and are mechanically and electrically coupled to the connector 120. That is, the bus bars 115 extending to the outside of the battery module 110 may be mechanically and electrically coupled to power patterns 122 provided in the connector 120 by welding.

In addition, sensing wires 116 are connected to each of the bus bars 115. The sensing wires 116 may be connected to the bus bars 115 by, for example, welding. The sensing wires 116 further extend to the outside of the battery module 110, and are mechanically and electrically coupled to the connector 120. That is, the sensing wires 116 extending to the outside of the battery module 110 may be mechanically and electrically coupled to sensing patterns 123 provided in the connector 120 by welding.

In addition, barriers 117a and 117b, which are electrically insulating and thermally conductive, may further be disposed between each of the battery cells 114. That is, barriers 117a are disposed between each of the battery cells 114 stacked in a horizontal direction, and barriers 117b are disposed between each of the battery cells 114 stacked in a vertical direction. The barriers 117a and 117b prevent or protect from unwanted electrical shorts between the battery cells 114, and/or the barriers 117a and 117b release or conduct away heat generated from the battery cells 114.

In addition, the connection member 113 is coupled between the lower cover 111a and the upper cover 111b, thereby allowing the plurality of battery cells 114 and the barriers 117a and 117b to be securely supported. In an example, the connection member 113 may include a bolt having a set or predetermined length, and a nut engaged with the bolt, but embodiments of the present invention are not limited thereto.

Figure 4A:
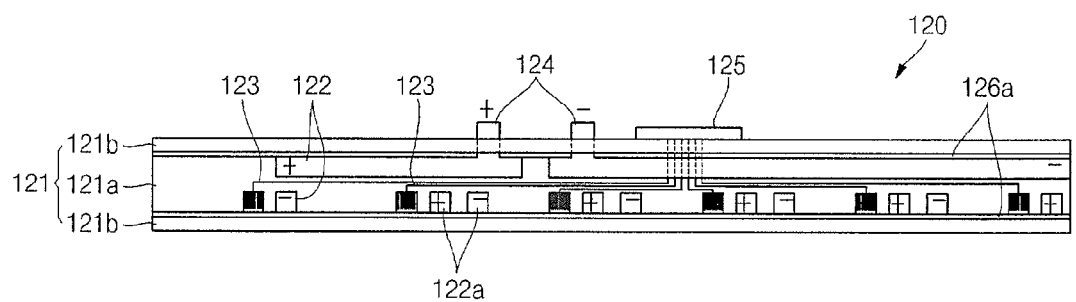
FIG. 4A is a front view illustrating a connector in the battery pack shown in FIGS. 1A and 1B.
Figure 4B:
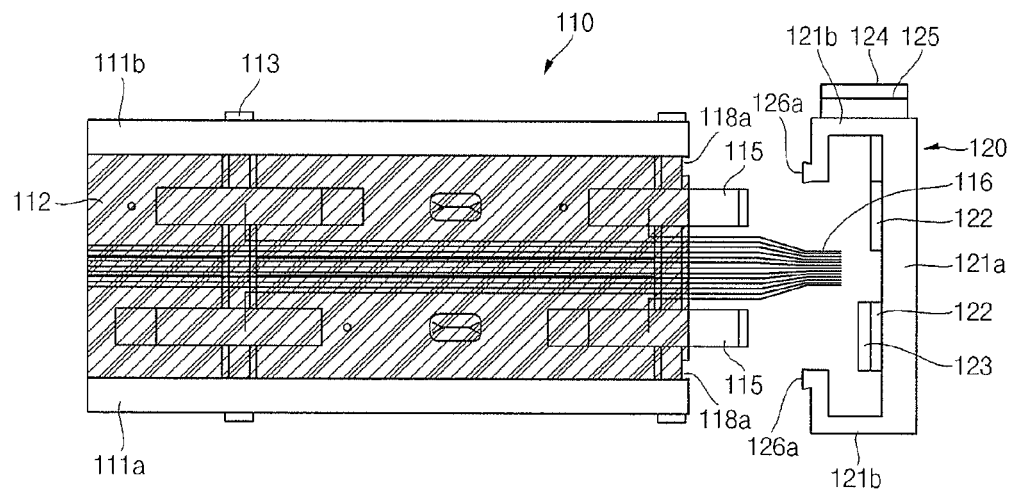
FIG. 4B is a front view illustrating a connection relationship between battery modules and the connector.

FIG. 4A is a front view illustrating a connector in the battery pack shown in FIGS. 1A and 1B, and FIG. 4B is a front view illustrating a connection relationship between battery modules and the connector.

Referring to FIGS. 4A and 4B, the connector 120 includes an insulation body 121, power patterns 122 formed in the insulation body 121, sensing patterns 123 formed in the insulation body 121, power terminal 124 formed in the insulation body 121, and a sensing terminal 125 formed in the insulation body 121.

The insulation body 121 includes, for example, a vertical body 121a, and a horizontal body 121b extending from bottom and upper ends of the vertical body 121a by a set or predetermined length in a horizontal direction. The insulation body 121 may be made of general thermally curable and/or thermosetting resin, but embodiments of the present invention are not limited thereto.

The power patterns 122 may be formed in the vertical body 121a in two rows, for example. The power patterns 122 may be made of, for example, copper or equivalents thereof, but embodiments of the present invention are not limited thereto. The bus bars 115 extending to the outside of the battery module 110 are mechanically and electrically coupled to the power patterns 122. In one example, positive and negative electrode bus bars 115 of the first battery module 110 are respectively coupled to upper and lower power patterns, that is, to the leftmost power patterns 122, as shown in FIG. 4A. Next, positive and negative electrode bus bars 115 of the second battery module 110 are respectively coupled to lower power patterns 122a adjacent to the leftmost power patterns 122. In this way, all of the battery modules 110 may be connected to the respective power patterns 122. In addition, since the power patterns 122 are electrically coupled to the power terminal 124, voltages of all battery modules 110 connected to each other in series may be output through the power terminal 124.

The sensing patterns 123 may also be formed in the vertical body 121a in a row, for example. The sensing wires 116 extending to the outside of the battery module 110 are mechanically and electrically coupled to the sensing patterns 123. In addition, the sensing patterns 123 are electrically coupled to the sensing terminal 125. Therefore, voltage data of all of the battery modules 110 and all of the battery cells 114 in the battery modules 110 are output to the sensing terminal 125.

As described above, the power terminal 124 is electrically coupled to the power patterns 122, and a charger or an external load are connected to the power terminal 124.

As described above, the sensing terminal 125 is electrically coupled to the sensing patterns 123, and a control circuit that controls charging and discharging of the battery pack 100 may also be connected to the sensing terminal 125.

As shown in FIG. 4B, the battery cells 114, the bus bars 115 and the sensing wires 116 between the lower cover 111a and the upper cover 111b may be covered by the protective cover 112. Alternatively, the bus bars 115 and the sensing wires 116 may be exposed and extend to the outside of the protective cover 112, specifically, to the outside of the battery module 110. The bus bars 115 exposed and extending in such a manner are connected to the power patterns 122 of the connector 120, and the sensing wires 116 are connected to the sensing patterns 123.

Here, the battery modules 110 may include connecting trenches 118a formed at its one side. The connecting trenches 118a are mechanically coupled to the connector 120. In one embodiment, the connecting trenches 118a are formed at the protective cover 112 of the battery module 110 and at one-side barrier 117a in a line shape. In addition, connecting protrusions 126a may also be formed at the connector 120, specifically, the horizontal body 121b of the connector 120, corresponding to connecting trenches 118a of the battery module 110.

Therefore, the connecting trenches 118a of the battery module 110 and the connecting protrusions 126a of the connector 120 are engaged with each other, thereby achieving a mechanical connection between the battery module 110 and the connector 120.

Figure 5:
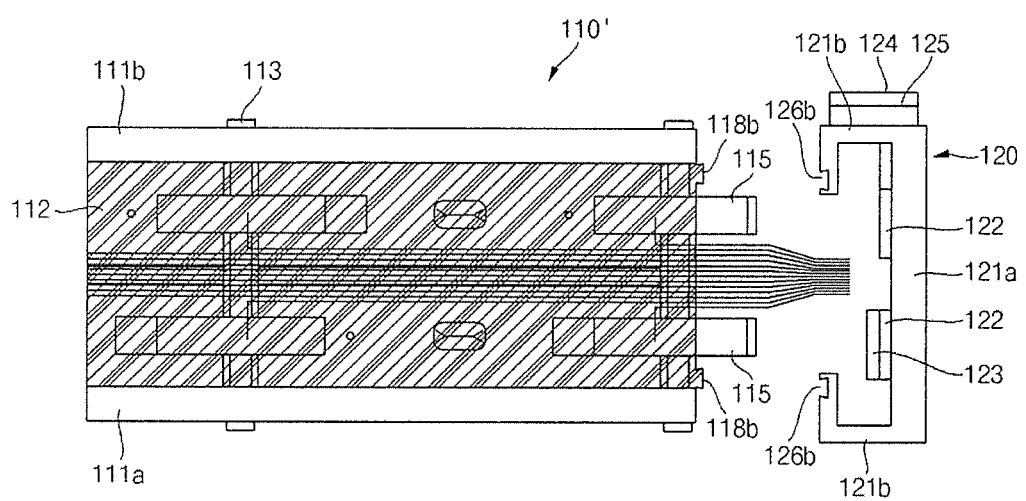
FIG. 5 is a front view illustrating a connection relationship between battery modules and a connector in a battery pack according to another embodiment of the present invention.

FIG. 5 is a front view illustrating a connection relationship between battery modules and a connector in a battery pack according to another embodiment of the present invention.

As shown in FIG. 5, the battery modules 110' may include connecting protrusions 118b at its one side to be mechanically coupled to the connector 120. In one embodiment, the connecting protrusions 118b are formed at a protective cover 112 of the battery module 110' and at one-side barrier 117a in a line shape. In addition, connecting trenches 126b may also be formed at the connector 120, specifically, the horizontal body 121b of the connector 120, corresponding to the connecting protrusions 118b of the battery modules 110'.

Therefore, the connecting protrusions 118b of the battery modules 110' and the connecting trenches 126b of the connector 120 are engaged with each other, thereby achieving a mechanical connection between the battery module 110' and the connector 120.

FIG. 6 is a front view illustrating an assembling method of battery modules in a battery pack according to an embodiment of the present invention.

As shown in FIG. 6, a plurality of battery cells 114 are stacked in vertical and horizontal directions. Here, barriers 117a and 117b are installed between the vertically stacked battery cells 114 and between the horizontally stacked battery cells 114, respectively. The barriers 117a and 117b disposed between each of the plurality of battery cells 114 are electrically insulating and thermally conductive. Therefore, unwanted shorts between each of the plurality of battery cells 114 can be prevented or protected from, and heat generated from the battery cells 114 is easily released or conducted to the outside of the battery cells 114. In one embodiment, the barrier 117a is also installed at the lateral portion of the outermost battery cell 114.

The lower cover 111a and the upper cover 111b are closely coupled to lower and upper portions of the stacked battery cells 114, respectively. In addition, the coupling of the lower cover 111a and the upper cover 111b is achieved by a connection member 113 comprised of a bolt 113a and a nut 113b. In such a manner, the plurality of battery cells 114 and the barriers 117a and 117b are kept to have set or predetermined shapes by the lower cover 111a and the upper cover 111b.

FIGS. 7A through 7F are front views illustrating a manufacturing method of a battery pack according to an embodiment of the present invention.

Figure 7A:
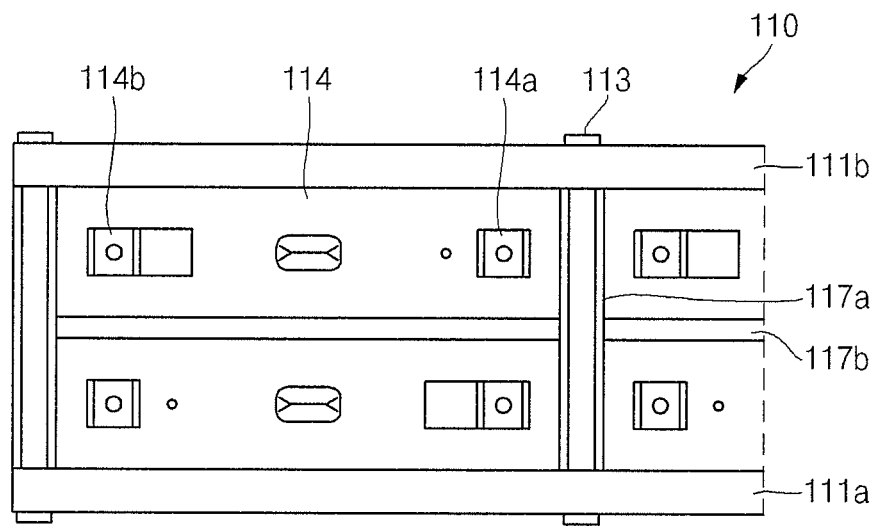
FIGS. 7A through 7F are front views illustrating a manufacturing method of a battery pack according to an embodiment of the present invention.

First, as shown in FIG. 7A, a battery module 110 is provided, including a plurality of battery cells 114 stacked in vertical and horizontal directions, a plurality of barriers 117a and 117b disposed between each of the battery cells 114, and a plurality of connection member 113 for coupling a lower cover 111a and an upper cover 111b to the battery cells 114. Each of the battery cells 114 includes a positive electrode terminal 114a and a negative electrode terminal 114b.

Figure 7B:
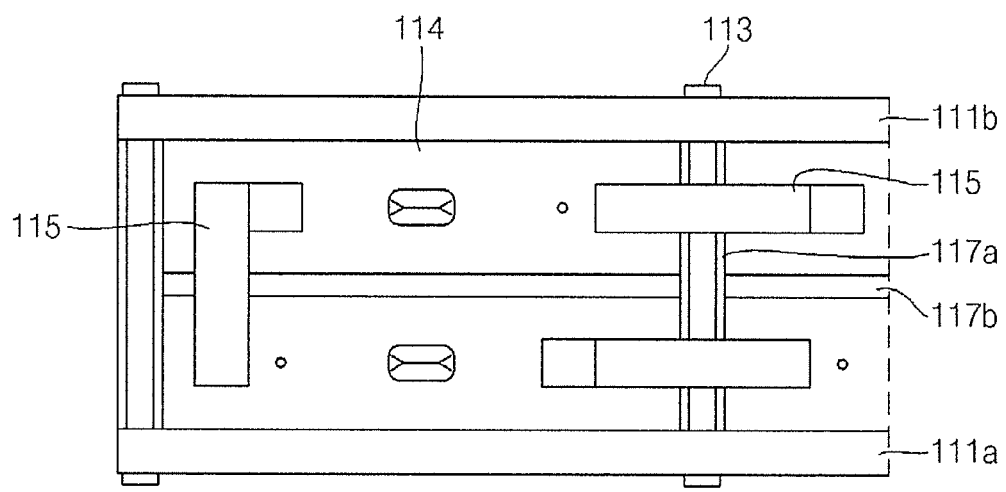

Next, as shown in FIG. 7B, bus bars 115 are electrically coupled to a negative electrode terminal 114b of one selected battery cell among the battery cells 114 and to a positive electrode terminal 114a of another battery cell adjacent to the one selected battery cell 114. In one embodiment, the bus bars 115 are welded to a negative electrode terminal 114b of one selected battery cell among the battery cells 114 and to a positive electrode terminal 114a of another battery cell adjacent to the one selected battery cell 114. The plurality of battery cells 114 are connected in series to each other by the aforementioned bus bars 115.

Figure 7C:
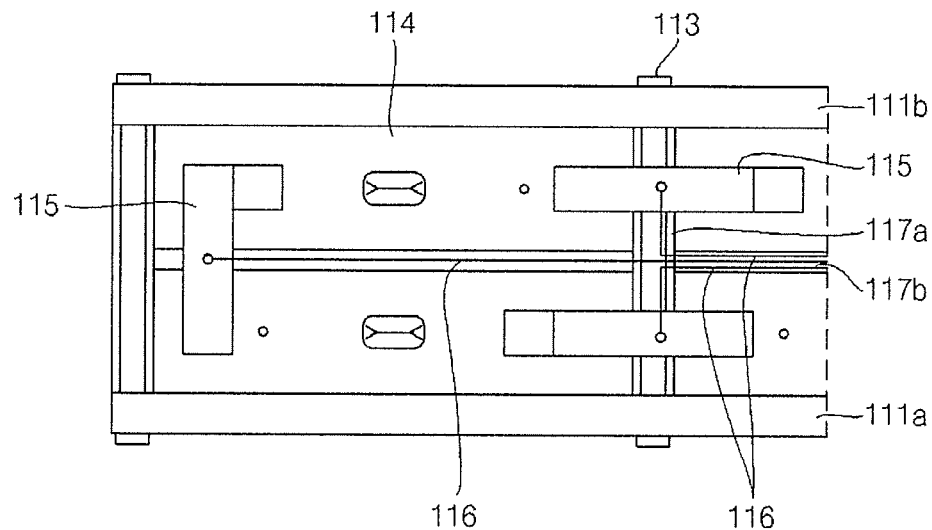

As shown in FIG. 7C, sensing wires 116 are electrically coupled to the bus bars 115. Further, a temperature sensor and sensing wires connected thereto may also be provided in each of the battery cells 114 or each of the battery modules 110.

Figure 7D:
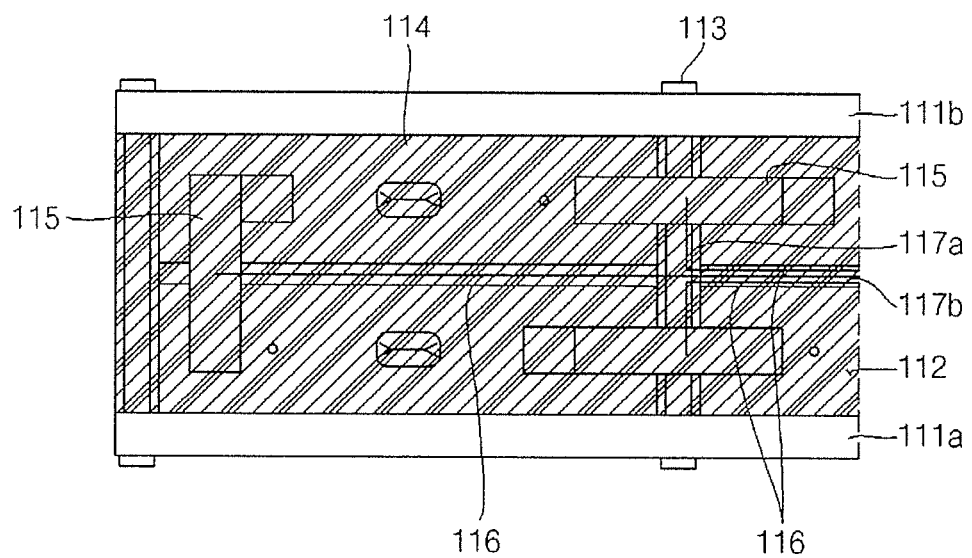

As shown in FIG. 7D, a protective cover 112 covers the battery cells 114, the bus bars 115 and the sensing wires 116, which are disposed between the lower cover 111a and the upper cover 111b. The protective cover 112 may be, for example, an insulating resin. More specifically, the protective cover 112 may be simply coupled between the upper cover 111b and the lower cover 111a, which are prefabricated. In addition, the protective cover 112 may be formed by inject molding. That is, an intermediate product shown in FIG. 7C is seated in a mold, a liquid-phase resin is transferred to the battery cells 114, the bus bars 115 and the sensing wires 116, which are disposed between the lower cover 111a and the upper cover 111b, and cooled, thereby forming the protective cover 112 covering the battery cells 114, the bus bars 115 and the sensing wires 116 between the lower cover 111a and the upper cover 111b.

Figure 7E:
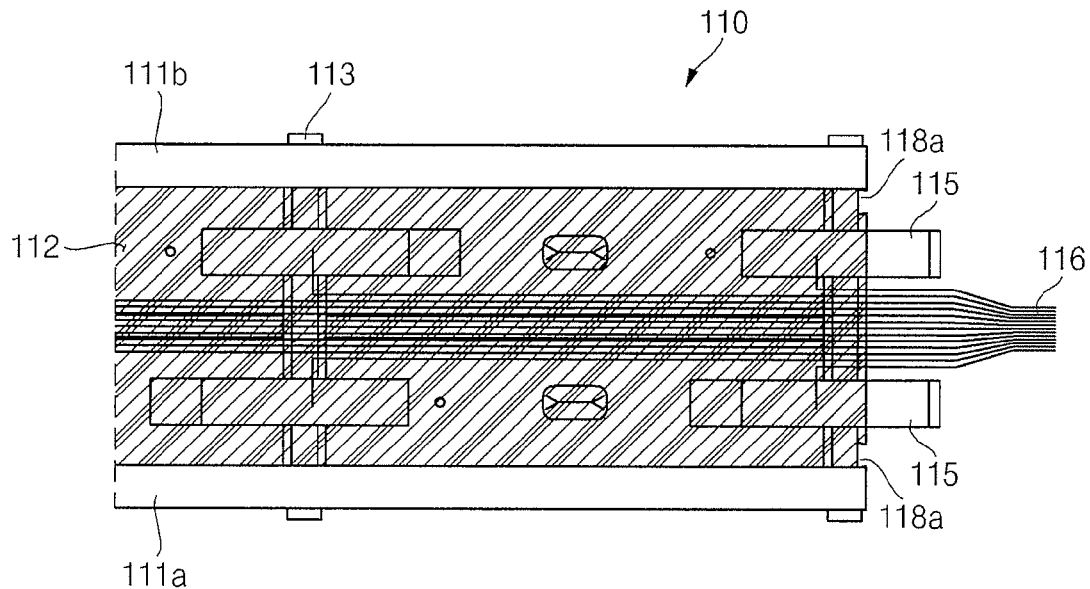

Here, as shown in FIG. 7E, some of the plurality of bus bars 115 are exposed and extended to the outside of the protective cover 112. Additionally, some portions of the sensing wires 116 are also exposed and extended to the outside of the protective cover 112. That is, the bus bars 115 and the sensing wires 116 are exposed and extended to the outside of the battery module 110. Moreover, connecting trenches 118a (or connecting protrusions) are formed at one side of the battery module 110. Practically, the connecting trenches 118a (or connecting protrusions) of the battery module 110 may be formed in the process of forming the protective cover 112, as shown in FIG. 7D. In one embodiment, connecting trenches 118a (or connecting protrusions 118b) are also formed at a barrier 117a facing the connector 120.

Figure 7F:
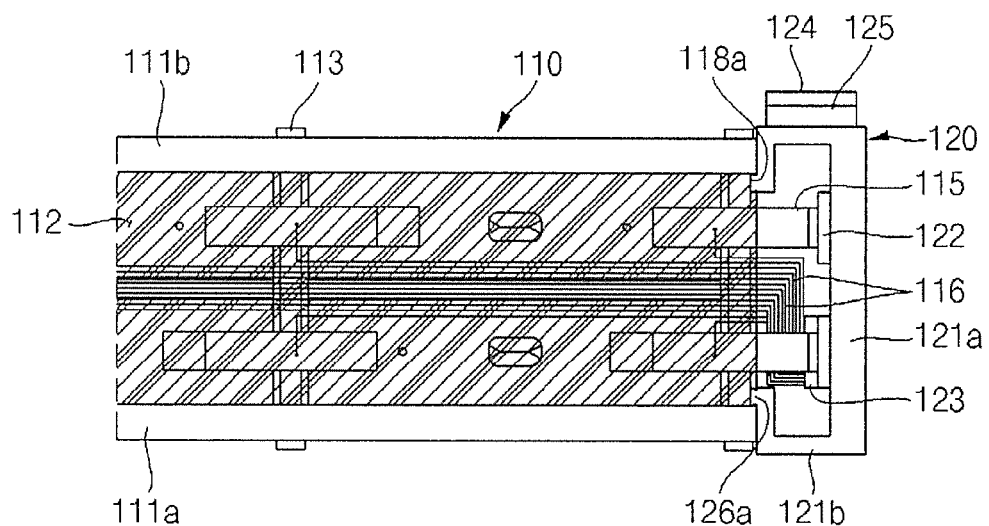

Finally, as shown in FIG. 7F, the bus bars 115 exposed and extended to the outside of the battery module 110 are electrically coupled to power patterns 122 provided in the connector 120. For example, the bus bars 115 are welded to the power patterns 122 to then be fixed. In addition, the sensing wires 116 exposed and extended to the outside of the battery module 110 are electrically coupled to sensing patterns 123 provided in the connector 120. For example, the sensing wires 116 are welded to the sensing patterns 123 to then be fixed.

Additionally, the connecting trenches 118a (or connecting protrusions) formed at one side of the battery module 110 are engaged with connecting protrusions 126a (or connecting trenches) of the connector 120. Therefore, the battery module 110 is electrically and mechanically coupled to the connector 120.

Further, the plurality of battery modules 110 are also electrically and mechanically coupled to the connector 120 in the above-described manner. Therefore, the plurality of battery modules 110 may be connected in series or parallel to each other. Additionally, the plurality of battery modules 110 may be stacked in a vertical or horizontal direction.

As described above, the battery pack 100 according to an embodiment of the present invention includes the plurality of battery modules 110 closely contacting each other and stacked in a vertical or horizontal direction, thereby achieving slimness and compactness.

Additionally, in the battery pack 100 according to an embodiment of the present invention, the plurality of battery modules 110 are electrically and mechanically coupled to the connector 120, thereby improving the manufacturing process efficiency of the battery pack 100.

Although arrangements and actuation mechanisms in the battery pack according to the present invention have been illustrated through particular embodiments, it should be understood that many variations and modifications may be made in those embodiments within the scope of the present invention by selectively combining all or some of the illustrated embodiments herein described. That is, while the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
    a plurality of battery modules, each battery module comprising:
        a plurality of battery cells stacked in vertical and horizontal directions;
        a plurality of bus bars electrically coupled to the plurality of battery cells;
        a lower cover contacting a bottom side of ones of the plurality of battery cells at a bottom of the battery module in the vertical direction; and
        an upper cover contacting a top side of other ones of the plurality of battery cells at a top of the battery module in the vertical direction, at least a portion of one of the plurality of bus bars extending beyond the upper cover and the lower cover in the horizontal direction; and
    a connector comprising an insulation body and power terminals in the insulation body, ones of the plurality of battery modules being electrically coupled to each other by the connector,
    wherein the plurality of battery cells of each of the plurality of battery modules are electrically coupled to each other at only one side of the respective battery module between the sides at which the upper and lower covers are arranged,
    the insulation body comprises a vertical body and two horizontal bodies respectively extending from bottom and top ends of the vertical body,
    connecting protrusions are formed at the horizontal bodies and connecting trenches are formed on one side of each of the battery modules or connecting trenches are formed at the horizontal bodies and connecting protrusions are formed on one side of each of the battery modules, and
    the connecting protrusions are engaged with the connecting trenches, thereby mechanically coupling each of the battery modules to the connector.

2. The battery pack of claim 1, wherein each battery module comprises a protective cover covering the plurality of battery cells and the plurality of bus bars.

3. The battery pack of claim 2, wherein a group of the plurality of bus bars extend out of the protective cover to be between the protective cover and the connector and are electrically coupled to a corresponding one of the power terminals.

4. The battery pack of claim 1, further comprising sensing wires connected to each of the plurality of bus bars, wherein the sensing wires are further connected to the connector.

5. The battery pack of claim 4, wherein the connector further includes a sensing terminal electrically coupled to the sensing wires.

6. The battery pack of claim 4, wherein each battery module further comprises a protective cover covering the plurality of battery cells, the plurality of bus bars and the plurality of sensing wires.

7. The battery pack of claim 6, wherein some of the sensing wires extend out of the protective cover and are electrically coupled to a sensing terminal of the connector.

8. The battery pack of claim 1, further comprising barriers, which are electrically insulating and thermally conductive, disposed between the plurality of battery cells stacked in the vertical direction or the horizontal direction.

9. The battery pack of claim 1, wherein the connecting trenches or the connecting protrusions are formed on a lateral portion of each battery module connected to the connector.

10. The battery pack of claim 1, wherein the connecting trenches or the connecting protrusions are formed on a lateral portion of the connector connected to each of the battery modules.

11. The battery pack of claim 1, wherein each battery module further comprises:
    a connection member connected to the battery module while passing through the respective lower cover and the upper cover.

12. The battery pack of claim 11, wherein the lower cover and the upper cover are made of steel or engineering plastic.

13. The battery pack of claim 1, wherein the connector further comprises a plurality of power patterns formed on a surface of the insulation body and electrically coupled to the bus bars and a corresponding one of the power terminals.

14. The battery pack of claim 6, wherein the connector further comprises a plurality of sensing patterns formed on a surface of the insulation body and electrically coupled to the sensing wires and a sensing terminal of the connector.

15. The battery pack of claim 1, wherein the portion of the plurality of bus bars which extends beyond the upper cover and the lower cover is directly between the two horizontal bodies of the insulating body.

16. The battery pack of claim 15, wherein the insulating body is coupled to each of the battery modules directly between the respective upper and lower covers.

* * * * *